Figure 7:
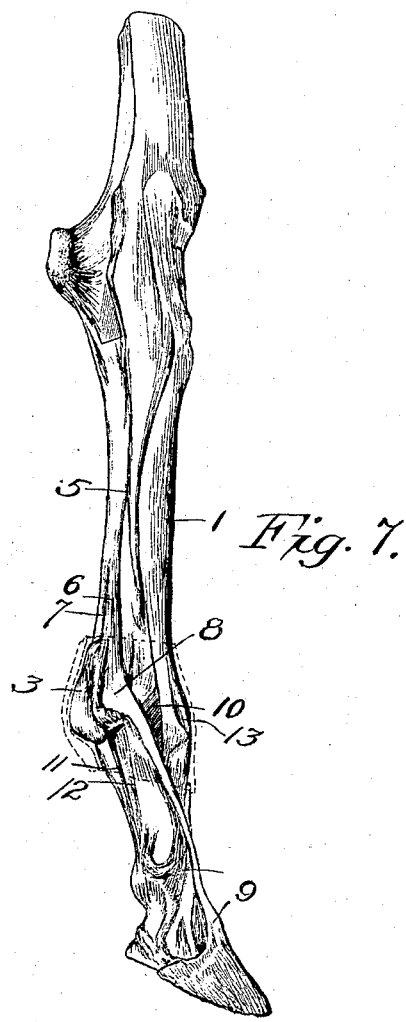

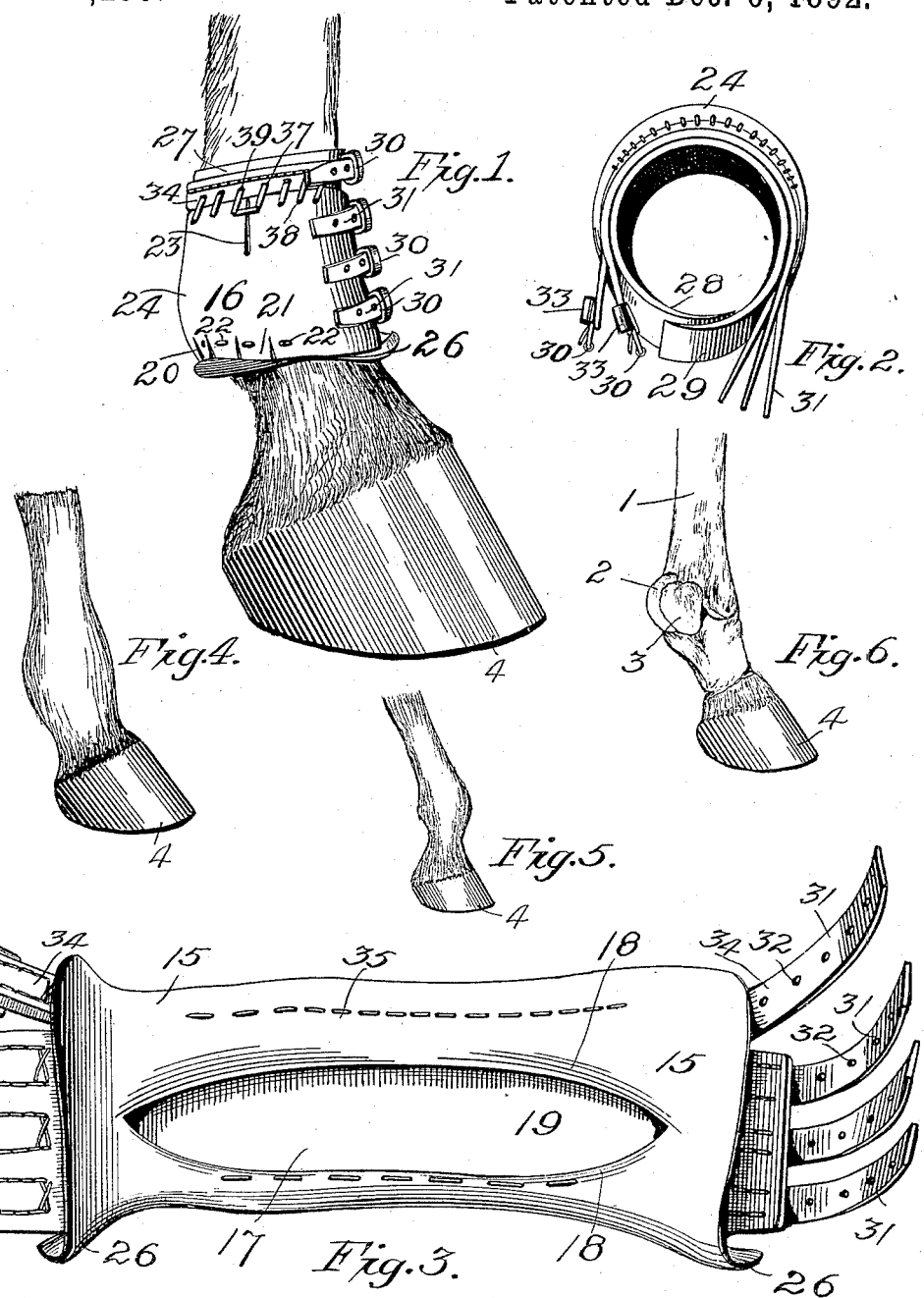

(No Model.) 2 Sheets—Sheet 2.
J. H. ROWELL.
HORSE BOOT.

No. 487,296. Patented Dec. 6, 1892.

Witnesses,
C. E. Van Doren.
O. G. Hawley.

Inventor,
James H. Rowell.
By Paul _____
Attorneys.

UNITED STATES PATENT OFFICE.

JAMES H. ROWELL, OF MINNEAPOLIS, MINNESOTA.

HORSE-BOOT.

SPECIFICATION forming part of Letters Patent No. 487,296, dated December 6, 1892.

Application filed March 22, 1892. Serial No. 425,974. (No model.)

*To all whom it may concern:*

Be it known that I, JAMES H. ROWELL, of Minneapolis, Hennepin county, Minnesota, have invented a certain new and Improved Ankle-Strengthener for Horses, of which the following is a specification.

The object of the invention is to provide effective means for strengthening and supporting the ankles or fetlocks of the animal and prevent the breaking down of the ligaments at the points well known to be the weakest in the horse. This breaking down is occasioned by excessive weight upon the ankles and most often appears in young colts, trotting horses, and stallions. For this purpose, as well as for temporarily binding and supporting swollen ankles, I provide a small adjustable collar or boot made of a flexible though non-stretchable material. This boot is formed to exactly fit the ankle of a horse when in its normal condition, and is strapped tightly in place.

My invention will be more readily understood by reference to the accompanying drawings, in which—

Figure 1 shows a device embodying my invention, the same being in place upon the ankle. Fig. 2 is a plan view of the same removed with the straps unloosened. Fig. 3 shows one of the supports spread open to show the form of the inner part thereof. Fig. 4 illustrates a swollen ankle. Fig. 5 shows a cockle-joint ankle. Fig. 6 is a view showing the bones of a horse's ankle; and Fig. 7 shows a leg, ankle, and hoof with the tendons and ligaments thereof, and the position of the ankle-strengther being indicated in dotted lines.

My ankle-strengtheners may be applied either to the fore legs or the hind legs of the horse, and in describing the relations of the same to the bones and ligaments of the ankles no distinction will be made between the anterior and posterior limbs.

By reference to Figs. 6 and 7 it will be seen that the ankle is made up of the large metacarpal bone 1, the outer and inner sesamoids 2 and 3, and the metacarpal phalanx. Beneath the latter is the second phalanx, os coronæ, and the os pedis and the hoof 4. The ankle-joint is strengthened and upheld by the ligament 5, which extends down on the rear side of the bone 1 and has the two branches 6 and 7 attached to the sesamoids 2 and 3 at the intermediate points of expansion 8, from whence the ligaments continue on down the sides of the lower bones to the attachment to the os pedis at points 9. The strong lateral ligament 10 has its ends attached on the forward side of the large metacarpal bone and extends down and around the ankle, binding the sesamoids in place. There are further ligaments 11 and 12, also extending down from these parts, and the large ligament 13 serves to bind the joint between the large metacarpal bone and the metacarpal phalanx. The breaking down of the ankle is due to the spraining, partial breaking, the slipping or detachment of the ligaments at the ankle-joint from the several bones thereof, and acts to let down the fetlocks, which in many cases strike the ground. A repetition of such an accident will often disable a most valuable horse, and where such a case remains unattended to will result in a painful and large swelling of the parts surrounding the ankle. Horses thus affected with swollen or weak ankles will be observed to bend or turn over the ankle, as shown in Fig. 5, throwing the ankle forward in order to gain as great a purchase through the ankle as possible without straining the ligaments and tendons thereof.

The boot which I have devised is made up of several parts, the principal of which are the inner lining 15 and the outer strap 16. These vary from three to six inches in length or height, according to the size of the horse upon which they are used, and the inner lining is wider than the outer portion of the device. The inner part is provided with the long slot 17, the edges 18 of which are beveled outwardly, merging smoothly into the inner surface 19 of the strap 16. This strap 16 has the notches 20 in its lower edge, and the flaps or lugs 21 between the same are drawn together by the leather strings 22, which also serve to fasten the lower edge of the lining 15. The upper edge is contracted in a similar manner, slots or cuts 23 being provided therein, as shown. In this manner the back and lower part 24 of the boot is bulged out and with the slot 17 of the lining forms quite a deep recess or heel adapted to receive the projecting part of the ankle in which the sesamoids are located. The lower edges 26 of the part 15 are thinned off and curved or bent outwardly, so as to form a smooth lower edge all around the boot, thereby preventing the rasping of the lower edge of the thick strap 16 upon the ankle. The lining 15 is wider than the outer part and, as shown at 27, projects above the extreme top thereof. The lining is also of a greater length than the strap, so that its ends 28 and 29, which are trimmed down thin, lap over and cover the forward side of the ankle, thoroughly protecting the same. On one end of the strap 16 I arrange the buckles 30, two or more in number, and upon the other side the short fastening-straps 31, corresponding thereto and provided with the strap-holes 32. The usual loops 33 are arranged back of the buckles. On the upper edge or part of the lining is the long strap 34, sewed thereto by the thread or thong 35 and having on one end the buckle 36. This strap has the perforations 37, and in the top of the part 24 are perforations 38. The cord 39 is laced through the openings of these two parts to bind the strap 34 to the top of the part 24. The forward side of the boot I preferably make a little deeper or longer than the rear part in order to give quite a long bearing upon the forward side of the ankle. Now it will be seen that when all of the straps are drawn tight through the buckles and are secured therein this boot, though made of heavy leather, will fit snugly to the ankle and as the swelling reduces may be drawn still tighter thereon and form a substantially-unyielding support for the ankle, rendering its breaking down practically impossible and giving time for the complete restoration of strength thereto.

My devices are also adapted for use in primarily preventing the breaking down of the ankles and are particularly adapted for use upon the posterior ankles of stallions, which during service are extremely apt to yield to the great weight brought to bear upon them.

Having thus described my invention, I claim as new and desire to secure by Letters Patent—

1. The combination, in an ankle-strengthener, of the lining having the slot 17 and overlapping ends with an outer strap 16, having contracted lower and upper edges, said lining secured on the inside of said strap, and straps and buckles on the latter for securing the same.

2. The combination, with the slotted inner lining having the overlapping ends, of the outer straps 16, having the contracted upper and lower edges, and the pocket to receive the projection of the ankle, the straps and buckles arranged upon said outer part or strap for securing together the ends thereof, and the strap 34, secured to both said parts and having the buckle for fastening the same, substantially as described.

3. The combination, with the inner lining, of the outer part 16, whereto the same is attached, said outer part having the contracted upper and lower edges, said lining being wider than the outer part and having the outwardly curved or flared lower edges 26, and means for securing the whole in place upon the ankle, as described, and for the purpose specified.

In testimony whereof witness my hand this 16th day of March, 1892.

JAMES H. ROWELL.

In presence of—
O. G. HAWLEY,
F. S. LYON.